UNITED STATES PATENT OFFICE.

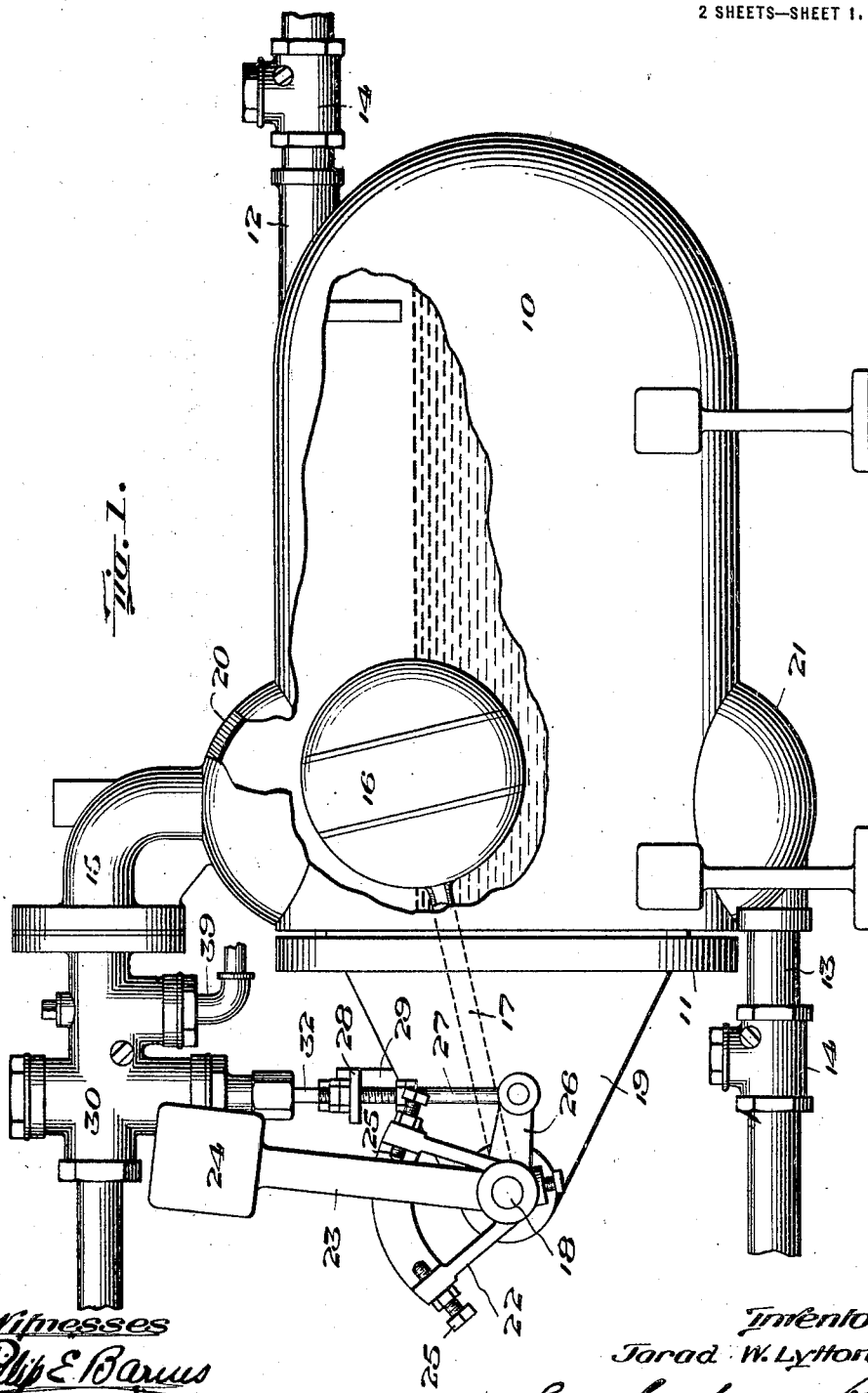

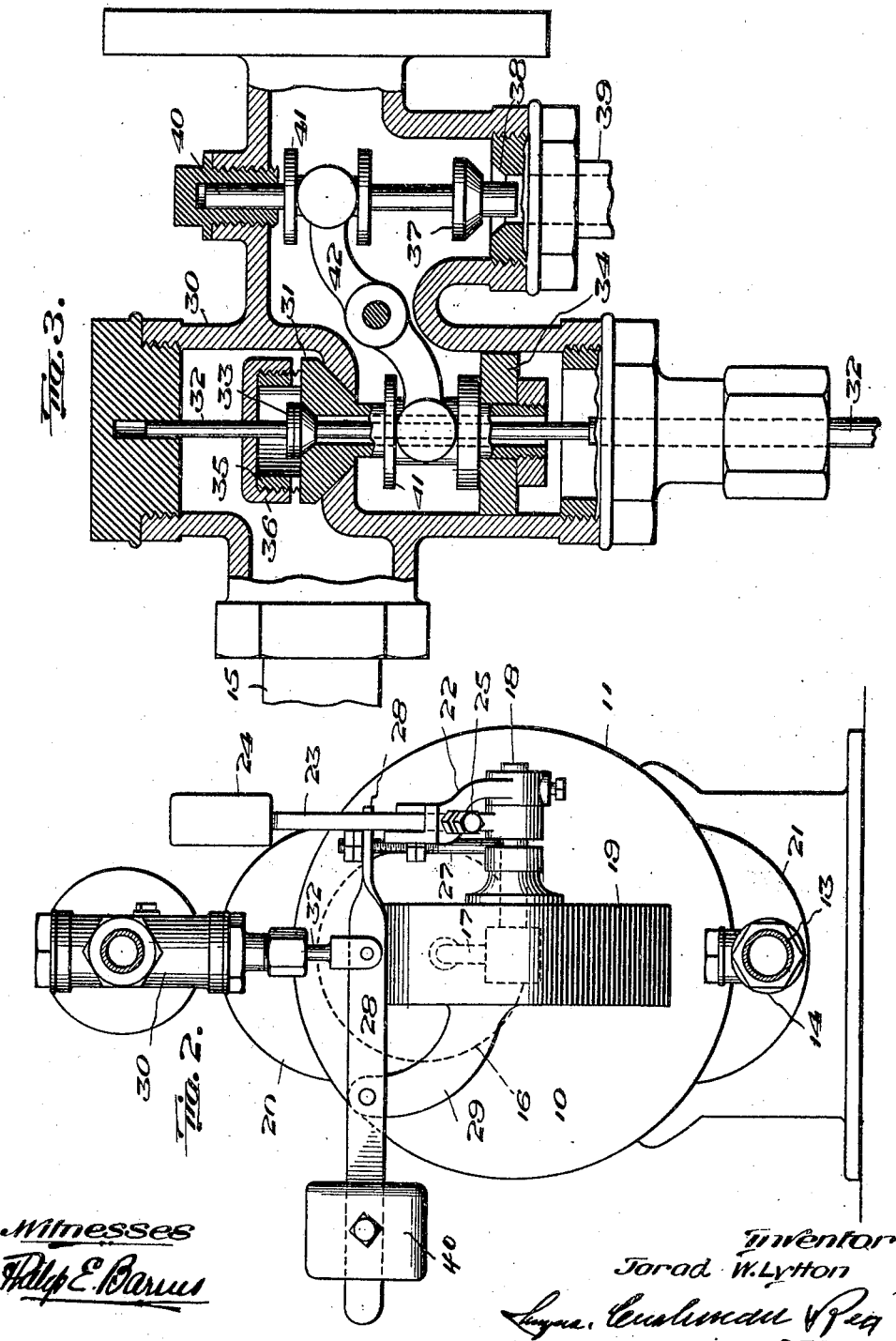

JARAD W. LYTTON, OF NORFOLK, VIRGINIA.

RETURN-TRAP.

1,316,843.  Specification of Letters Patent.  Patented Sept. 23, 1919.

Application filed August 9, 1918. Serial No. 249,177.

*To all whom it may concern:*

Be it known that I, JARAD W. LYTTON, a citizen of the United States, residing at Norfolk, in the county of Norfolk and State of Virginia, have invented new and useful Improvements in Return-Traps, of which the following is a specification.

This invention relates to return traps of the type adapted to collect the water of condensation in a steam system and to automatically return the water under pressure to the boiler.

My invention has among its objects to provide a steam trap which is simple in construction and economical in manufacture and use; to provide a return trap which is efficient in operation, in that after the trap has become full of water of condensation, it will be emptied in a minimum amount of time; and to provide the return trap with an improved valve of simple construction which will efficiently control the admission of steam to the trap for the purpose of forcing the accumulated water of condensation therefrom and which will permit venting of the trap to the atmosphere when the admission of steam is shut off.

In the accompanying drawings I have illustrated one embodiment of my invention, but it is to be understood that the present disclosure is by way of illustration only and is not restrictive of my invention for the same is susceptible of various modifications and changes which would be within the spirit of my conception without departing from the scope of the appended claims.

In said drawings—

Figure 1 is a side elevational view of my improved return trap, part of the casing thereof being broken away to show the float.

Fig. 2 is an end view of the trap; and

Fig. 3 is a sectional view through my improved valve mechanism.

Referring to the drawings, wherein like numerals represent like parts in the several views, 10 designates a trap body or casing, preferably, cylindrical in shape, and having a removable head 11. Delivering into one end of the casing 10, and preferably into the top thereof is an inlet or return pipe 12 which conducts the water of condensation from the steam system to the trap, and leading from the bottom of the trap is an outlet pipe 13 which connects to the boiler (not shown) for returning the water of condensation thereto. The pipes 12 and 13 are provided with nonreturn check valves 14. Leading from the top of the boiler and discharging into the top of the casing 10, preferably, above the point at which the outlet pipe is connected to the trap, is a steam pipe 15 through which steam pressure from the boiler is admitted to the upper portion of the casing to force the water of condensation collecting therein back to the boiler. The steam pipe 15 has a suitable valve mechanism to be hereinafter described which automatically controls the admission of steam to the casing and vents the casing to the atmosphere.

The valve mechanism in the steam pipe 15 is controlled by the usual ball float 16 having a hollow stem 17 secured to a shaft 18 which extends transversely through the outer end of a hollow lateral projection 19 carried externally of the removable head 11. It is understood that as the water of condensation collects in the casing 10, the float will rise until the valve mechanism in the steam pipe 15 is operated to admit steam from the boiler to the casing, whereupon the water will be forced under pressure through the outlet pipe 13 to the boiler, and the float will fall, and when the float has reached its lowermost point of travel, the valve mechanism will be operated to shut off the admission of steam to the casing. The arm or stem 17 is preferably hollow so that in case the float 16 should leak, the water collecting therein will flow into the stem 17 and thus relieve the float 16 of the weight of the water.

Preferably the steam pipe 15 discharges into a spherical projection 20 in the upper wall of the casing 10, the internal radius of the projection 20 being substantially the same as the external radius of the float 16, so that it will snugly receive the float when the latter has moved into its uppermost position.

With this construction, the capacity of the trap is materially increased, for the float in rising, will enter the projection 20, and the water of condensation is permitted to rise until it substantially fills the body portion of the casing. This construction also makes the trap more efficient in operation for, since the water can rise to almost fill the casing, when the steam is admitted thereto, it is not necessary for the steam to fill a large air space above the surface of the water before it will exert pressure thereon. The size of the air space between the surface of the water, when it has reached its highest level, and the top of the casing, and especially is this true as the casing is of cylindrical form in vertical section, is substantially negligible, and the steam will exert a downward pressure upon the surface of the water, immediately after the steam is admitted. It will also be noted that there is practically no air space between the ball float 16 and the walls of the projection 20 which must be filled before the full pressure of the steam is communicated to the surface of the water in the casing.

The outlet pipe 13 leads from a spherical projection 21 depending from the bottom of the casing, and this projection is similar to the one just described. The projection 21 receives the ball float 16 when the latter has reached its lowermost point, and allows practically all of the water to flow from the casing 10.

Fixedly mounted upon an end of the shaft 18 so as to move with the shaft and float 16 is a segment 22. Between the arms of the segment 22 and loosely mounted on the shaft 18 is a weight lever 23 carrying at its upper or free end a weight 24. When the float 16 rises and falls the segment 22 rotates therewith and the segment carries the weight lever 23 past its center of gravity after which the lever will fall due to gravity to the other side of the segment. The movement of the lever may be adjusted by means of set screws 25 carried by the segment. The weight lever 23 carries an outstanding arm 26 to the outer end of which is pivoted a link 27 which passes loosely through an aperture in the free end of the lever 28 extending transversely of the projection 19 and hinged at its opposite end to an ear 29, extending outwardly from the projection 19. The lever 28 is preferably constructed of a strip of flat metal bent at right angles intermediate its ends. In the steam pipe 15 is located a valve casing 30 which houses the valve mechanism for admitting steam to the trap and venting the trap. The valve mechanism consists, in part, of a main or piston valve 31 which controls the admission of steam through the opening of the valve casing. The piston valve 31 has a central longitudinal opening through which a preliminary valve stem 32, carrying a preliminary valve 33, extends. The lower end of the stem 32 is connected to the lever 28 intermediate the ends of the latter. Upon the lower end of the main valve stem is a piston 34 snugly fitting the chamber in which it is mounted, and this piston is of greater area than the valve head 31 so that, when steam pressure is admitted to the underside of the piston, the main valve will be raised from its seat. The piston valve 31 has an annular apertured flange 35 adapted to receive a cap 36 which prevents any foreign solid matters from passing downwardly through the opening in the main valve. 37 designates a vent valve having a valve seat 38 located in the vent opening leading into a vent pipe 39. The vent valve 37 is carried by a stem 40 which is in parallelism with the main valve stem. Each of the stems of the valves 31 and 37 has a pair of spaced-apart abutments or circumferential flanges 41, and between the valves is a lever 42 pivoted intermediate its ends and having its opposite ends forked so as to straddle the main valve stem and the vent valve stem at points between the abutments 41.

The operation of the device will be readily understood from the foregoing description. The water of condensation is delivered into the trap body 10 from the system to be drained by the delivery pipe 12. The level of the water of condensation in the trap body 10 will rise until the float 16 fits within the projection 20. As the ball reaches the upper limit of its travel, the weight 24 is moved past its center of gravity and will fall to the left, referring to Fig. 1, with a rapid movement, and this movement is imparted to the preliminary valve 33 through the links or levers 27 and 28. It will be seen that the preliminary valve 33 is positively actuated with a sharp movement so as to prevent sticking of the valve due to accumulation of scales or other foreign matter collected in the system. Upon raising the preliminary valve 33, steam will be admitted from the steam pipe 15 to the space beneath the piston 34 causing the piston, together with the attached main valve 31, to rise, and uncovering the main valve seat to permit steam to pass from the pipe 15 through the valve mechanism to the projection 20. The pressure of the steam upon the ball float 16 and the surface of the water within the trap body will force the water, against steam pressure, through the outlet pipe 13 back into the boiler. As the level of the water within the trap falls, the float will move downwardly to revolve the shaft 18 in clockwise direction, and the weight lever 23 will be moved to the right and the quick movement of the weight will bring the preliminary valve 33 sharply to its seat. As the through passage in the main valve is now closed, the main valve will fall to its seat, shutting off steam pressure to the upper part of the trap body. The vent valve 37 is operated simultaneously with the main valve. When the main valve is seated the vent valve is open so as to permit the air which accumulates in the top of the trap to vent to the atmosphere or to the system for the purpose of returning steam from the trap back to the system. When the main valve is moved into open position, the vent valve 37 is brought into closed position, due to the lever 42 so as to prevent the steam from passing directly from the steam pipe to the vent pipe 39.

I preferably provide the lever 28 with an extension, as shown in Fig. 2, on which is mounted a weight 40 tending to maintain the lever 28 in one extreme position, namely, the position shown in Fig. 2, to open the main valve, the purpose being to prevent a return of the main supply valve prematurely to its seat if the trap is operating under very low pressure or there is not sufficient pressure to maintain the vent valve 37 on its seat against the weight of the preliminary valve 33 and its associtaed parts.

What I claim is:—

1. In a return trap, a casing having a water inlet and outlet, a steam inlet, a shaft mounted in bearings on the casing, a float within the casing having its stem connected to the shaft, a segment fixed on the shaft outside the casing, a weighted lever loosely mounted on the shaft and adapted to oscillate between the arms of said segment, a valve mechanism in the steam inlet, and connections between the weighted lever and said valve mechanism for controlling the admission of steam to the casing.

2. In a return trap, a casing, a water conduit opening into said casing, an outlet for conducting water from said casing, a steam inlet communicating with the casing, a hollow bracket projecting from the casing, a shaft mounted in said bracket, a float in the casing having its stem connected with said shaft, a weighted arm loosely mounted on said shaft, a V-shaped tappet rigidly mounted on said shaft and arranged so that the arms thereof alternately engage said arm for oscillating the same in direct response to the vertical oscillations of the float, a valve casing connected with the steam inlet, and provided with a steam supply port and vent, a valve stem connected with said weighted lever and extending into the valve casing, and valves controlling the steam supply port and vent of the valve casing adapted to be simultaneously actuated by said stem whereby when one is closed the other is opened for the purpose described.

3. In a return trap, a casing, having a water inlet, and outlet, a steam inlet communicating with the casing, a float in said casing, a projection on said casing, a shaft extending through said projection, a stem pivoted to said shaft and carrying said float at its free end, a segment fixed on the shaft outside the casing, a weighted lever loosely mounted on the shaft to oscillate between the arms of said segment, an arm extending laterally from the weighted lever, a valve mechanism in the steam inlet, and a link connecting said arm of the weighted lever with and adapted to actuate said valve mechanism, for the purpose described.

4. In a return trap, a casing, a float in said casing, a shaft extending through said casing, a stem pivoted to said shaft and carrying said float at its free end, a segment fixed on one end of said shaft, a weight lever loosely mounted on said shaft and adapted to rotate between the arms of said segment, an arm fixed to said weight lever, a link pivotally connected to said arm, a lever fixed at one end and having an aperture at its free end adapted to receive said link, a steam inlet pipe, a valve casing in said inlet pipe having a main valve seat, a main piston valve for said seat, and a preliminary valve having a stem extending through said piston valve and downwardly through said valve casing, the lower end of said stem being connected to said lever intermediate the ends thereof.

5. In a return trap, the combination with a casing having a water inlet and outlet, a steam inlet, and a float in said casing adapted to rise and fall with the passage of water therethrough, of a valve mechanism in said steam inlet comprising a main piston valve, a preliminary valve for said piston valve, a vent valve, a valve casing inclosing said main valve, preliminary valve and vent valve, a connection between said vent valve and piston valve, and a connection between said float and said preliminary valve.

6. In a return trap, the combination with a casing having a water inlet and outlet, a steam inlet, and a float in said casing adapted to rise and fall throughout the depth thereof with the passage of water therethrough, of a valve casing in said steam inlet, a main valve in said valve casing, a preliminary valve in said valve casing, a vent valve in said valve casing, a lever connection between said vent valve and said main valve so as to cause the same to operate simultaneously, and a connection between the float and said preliminary valve for raising the latter when the float reaches a predetermined height to admit steam to said trap.

7. In a return trap, the combination with a casing having a water inlet and outlet, a steam inlet, and a float in the casing adapted to rise and fall with the passage of water therethrough, of a valve casing in said steam inlet having a main valve seat and a vent opening to the trap side of said seat, a main valve for controlling the admission of steam through said seat, a stem for said main valve having an opening therethrough and carrying a piston, a preliminary valve having a seat in the upper end of said main valve, a stem for said preliminary valve extending loosely through the opening in said main valve stem, a vent valve stem in parallelism with said other stems, a vent valve on said stem for controlling said vent opening, a lever pivoted intermediate its ends for connecting said main valve stem and vent valve stem so that when the main valve is moved from its seat the vent valve will be moved to its seat, and a connection between said float and said preliminary valve stem.

In testimony whereof I have hereunto set my hand in presence of two subscribing witnesses.

JARAD W. LYTTON.

Witnesses:
  JNO. D. ABLEITT,
  E. FRANK STORY.

Copies of this patent may be obtained for five cents each, by addressing the "Commissioner of Patents, Washington, D. C."